Dec. 5, 1950 J. H. BENDER ET AL 2,532,593
MEANS FOR MEASURING WHEEL ALIGNMENT
Filed Nov. 6, 1946 2 Sheets-Sheet 1
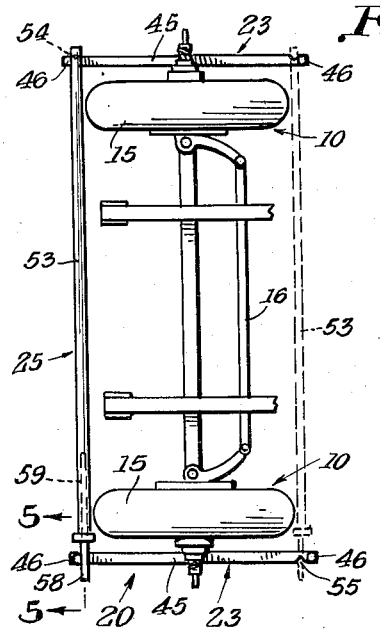
Fig.1.
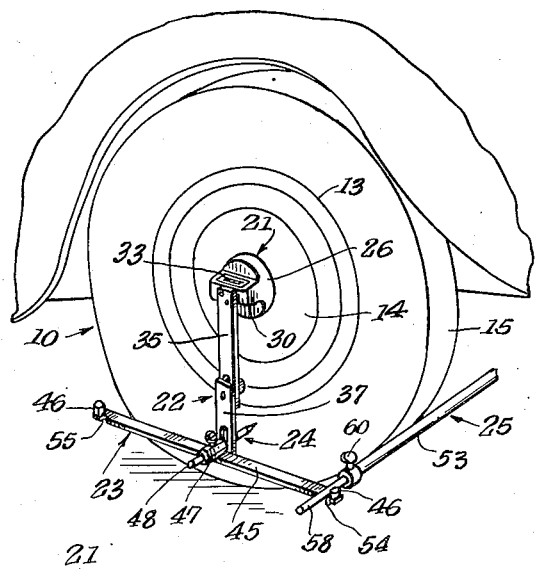
Fig.2.
Fig.3.
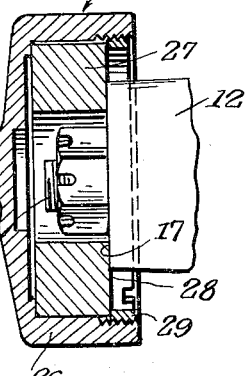
Fig.6.
Fig.4.
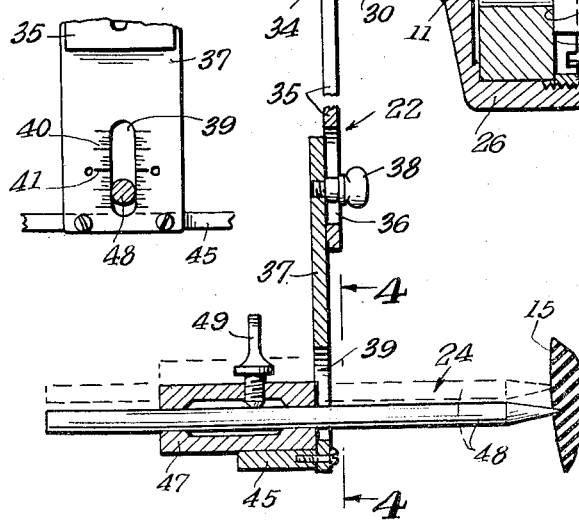
Fig.5.
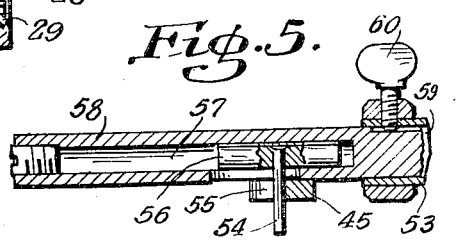
J. H. BENDER
and DONALD H. SHOOTER
INVENTORS.
BY C. G. Stratton
ATTORNEY.

Dec. 5, 1950 J. H. BENDER ET AL 2,532,593
MEANS FOR MEASURING WHEEL ALIGNMENT
Filed Nov. 6, 1946 2 Sheets-Sheet 2
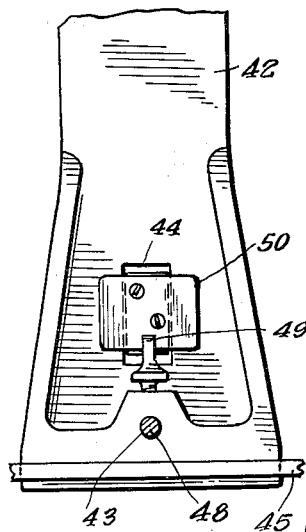
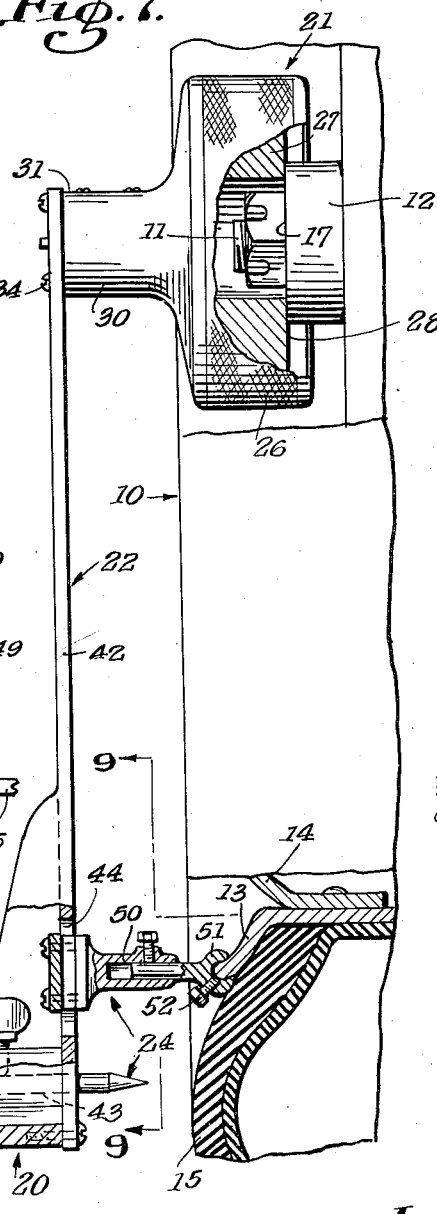
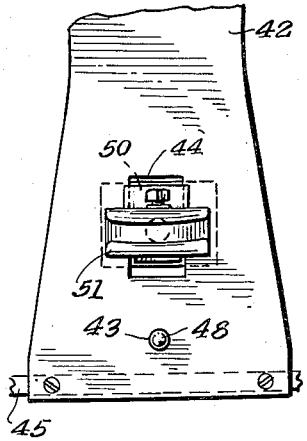
J. H. BENDER
and DONALD H. SHOOTER
INVENTORS.
BY C. G. Stratton
ATTORNEY.

Patented Dec. 5, 1950

2,532,593

UNITED STATES PATENT OFFICE 2,532,593

MEANS FOR MEASURING WHEEL ALIGNMENT

John H. Bender and Donald H. Shooter, Maywood, Calif.

Application November 6, 1946, Serial No. 708,178

7 Claims. (Cl. 33—203.2)

This invention relates to devices for measuring wheel alignment of automotive vehicles.

The primary object of the present invention is to provide a wheel alignment measuring device which is applied directly to the wheel hubs of a pair of wheels and is completely independent of both the wheels and the tires whereby the measurements obtained show the actual misalignment, if any, between the wheel axles and are not influenced by inaccuracies in the wheels and tires.

Another object of the invention is to provide a wheel alignment measuring device which is magnetically applied directly to accurate machined surfaces of the hubs of a pair of wheels for quick, easy and accurate application of the device in operative position, and accurate reading thereof for determining the degree of misalignment of the hubs and, therefore, of the wheels.

Another object of the invention is to provide a device of the character indicated which, while independent of the wheels and tires for accurate mounting in operative position, has position holding means engaging either the tires or the wheel fellies, said latter means having no influence on the accuracy of positioning of the device.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a top plan view of a pair of wheels of an automotive vehicle showing the present device in operative position for measuring the alignment of said wheels.

Fig. 2 is a somewhat enlarged perspective view showing the device as applied to one of said wheels.

Fig. 3 is a further enlarged broken vertical sectional view through the vertical center of one side of the device.

Fig. 4 is a fragmentary sectional view as taken on the line 4—4 of Fig. 3.

Fig. 5 is a similar view as taken on line 5—5 of Fig. 1.

Fig. 6 is a fragmentary elevational view of a portion of Fig. 5.

Fig. 7 is a partially elevational, partially sectional view showing the application of a modified form of device to a wheel.

Fig. 8 is a broken side view thereof as seen in the direction of the arrow 8 of Fig. 7.

Fig. 9 is a similar view of the opposite side of the portion shown in Fig. 8, the view being seen in the direction of arrows 9 of Fig. 7.

As shown, the wheels 10 of a vehicle are each mounted on an axle 11 and conventionally comprise a hub 12, a felly 13 connected to the hub by a disc or the like 14, and a pneumatic tire 15. For efficient operation of a vehicle, said wheels, particularly the front ones, are interconnected by means 16 which, conventionally, is adjustable. Said means also comprises a portion of the steering means of the wheels and, therefore, of the vehicle. There are many causes for the wheels 10 to become mis-aligned; a condition which can be corrected by adjustment of the means 16. The present device is intended to measure such misalignment and thereby enable the accurate adjustment of the means 16. Inasmuch as the hub surface 17 is a machined face and, therefore, accurate, said surface, on each wheel, is used for mounting the instant device.

The measuring or gauging device shown at 20 comprises, generally, a hub engaging member 21 for each wheel, means 22 depending from the member 21, a longitudinal member 23 carried by the lower end of the means 22, means 24 for locating the means 22 and the member 23 after adjusted positioning of the member 21 on the hub 12, and a transverse member 25 for spanning between the paired ends of the members 23 for measuring the difference, if any, in the dimensions across said paired ends.

The member 21 comprises a cup 26 in which is placed a permanent magnet 27 of square cross-section and annular form. Said magnet is thus provided with an outer flat face 28 adapted for engagement with the face 17 of the wheel hub 12. A retaining ring 29, threadedly engaged with the cup 26, holds the magnet 27 in place. A suitably designed electro-magnet may be substituted for the permanent magnet shown. A lateral extension 30 is provided on the cup 26, said extension having a flat top face 31 in which is formed a transverse recess 32 for a spirit level 33. The air bubble of the spirit level guides the accuracy of application of the member 21 on the wheel hub.

The means 22 is secured, as by screws 34, to the extension 30 to be true vertically with the spirit level so that assurance is had that said means is accurately vertical upon application of the member 22. Said member, as shown in Figs. 2 and 3, comprises a bar 35 having a slot 36 near its lower end, and an extension bar 37 secured by a thumb screw 38 extending through the slot 36. The means 22 is thus extensible for length according to the size of the wheels 10. The lower end of bar 37 is formed with a slot 39 and a series of graduations 40 from a zero point 41 in both directions, up and down, are associated with the slot 39.

In the modification of Figs. 7 to 9, the means 22 comprises an integral casting having a bar 42 formed with a hole 43 instead of the slot 39 and with a slot 44 above said hole for one portion of the locating means 24.

The member 23 comprises a bar 45 secured at its midpoint to the lower end of the means 22 to extend along the side of the wheel 10 as best seen in Figs. 1 and 2. Each end of the bar 45 is provided with an upstanding stop post 46, said posts being uniformly spaced with respect to the means 22.

In the form shown in Figs. 2 and 3, the means 24 comprises a block 47 in which is adjustably mounted a pointed rod 48 which is designed to impinge the wall of the tire 15 and to be secured in the block 47 by a thumb screw 49. The rod 48 has frictional engagement in the slot 39 for vertical positioning therein with relation to the graduations 40.

In the form of Figs. 7 to 9, the means 24 is similar to that above described except that the rod 48 extends through the hole 43. As an alternate locating and holding means, a slide 50 mounted on bar 42 to move in slot 44 may be provided for engaging the wheel rim or felly 13. Said slide is provided with an adjustable member 51 which, by means of a set screw 52 can be secured to said felly and thereby locate the means 22 and the member 23 as determined by the spirit level 33.

The transverse member 25 comprises a rod 53 having a pin or the like 54 at each end for engagement in notches 55 formed in the outer ends of the bars 45. One of the pins 54 is adjustable with respect to the other. Said adjustable pin is carried by a slide bar 56 in a bore 57 of an extensible end member 58 mounted in a longitudinal end bore 59 in the rod 53. A set screw 60 secures the members 58 in the bar 53.

In use, the members 21 are applied to each hub 12 as described so that the means 22 are accurately vertical as indicated by a central position of the bubble of each spirit level 33. Either the rod 48 or the member 51 is engaged to hold the means 22 rigid so that the bars 45 are horizontally parallel. The member 25 is then placed across one pair of ends of the bars 45 with the pins 54 engaged in notches 55 in said ends. The member 58 is then adjusted to bring the zero point 61 of scale 62 on said member in alignment with the pin 54 carried thereby. The transverse member 25 is then removed and similarly placed across the other pair of ends of bars 45 and a plus or minus reading of scale 62 with respect to the new position of the associated pin 54 is made to determine the degree of mis-alignment of the bars 45 and, consequently, of the wheel hubs 12 and the wheels 10. Correction can accordingly be made in the wheel connecting means 16.

While we have illustrated and described what we now regard as the preferred embodiments of our invention, the construction is, of course, subject to modifications without departing from the spirit and scope of our invention. We, therefore, do not wish to restrict ourselves to the particular forms of construction illustrated and described, but desire to avail ourselves of all modifications that may fall within the scope of the appended claims.

Having thus described our invention, what we claim and desire to secure by Letters Patent is:

1. A device for measuring the alignment of a pair of wheels comprising a member embodying a magnet having a flat face for magnetic engagement with the machine-faced end of the hub of each wheel, there being two such members, one engaged with each wheel hub, a bar fixed to and depending from each member, a bar mounted transversely at the end of each depending bar, a spirit level on each member having the magnet for rotationally guiding the horizontal accuracy of position of the respective transverse bars, the ends of the latter bars being each equidistant from the vertical center of the wheels, one end of each transverse bar being forward of the wheels and the other end of each bar being rearward of said wheels, said bar ends being thereby arranged in forward and rearward aligned pairs and a telescopic measuring bar adapted to be positioned to span first between one said pair of ends and then between the other said pair of ends, said measuring bar embodying a scale for reading the difference of the distances between the aligned pairs of ends of the transverse bars.

2. A device for measuring the alignment of a pair of wheels comprising a member embodying a magnet having a flat face for magnetic engagement with the machine-faced end of the hub of each wheel, there being two such members, one engaged with each wheel hub, a bar fixed to and depending from each member, a bar mounted transversely at the end of each depending bar, a spirit level on each member having the magnet for rotationally guiding the horizontal accuracy of position of the respective transverse bars, the ends of the latter bars being each equidistant from the vertical center of the wheels, one end of each transverse bar being forward of the wheels and the other end of each bar being rearward of said wheels, said bar ends being thereby arranged in forward and rearward aligned pairs, an adjustable element carried by each depending bar for engaging each respective wheel to maintain the accuracy of position of the respective transverse bars, and a telescopic measuring bar adapted to be positioned to span first between one said pair of ends and then between the other said pair of ends, said measuring bar embodying a scale for reading the difference of the distances between the aligned pairs of ends of the transverse bars.

3. A device for measuring the alignment of a pair of wheels comprising a member embodying a magnet having a flat face for magnetic engagement with the machine-faced end of the hub of each wheel, there being two such members, one engaged with each wheel hub, a bar fixed to and depending from each member, a bar mounted transversely at the end of each depending bar, a spirit level on each member having the magnet for rotationally guiding the horizontal accuracy of position of the respective transverse bars, the ends of the latter bars being each equidistant from the vertical center of the wheels, one end of each transverse bar being forward of the wheels and the other end of each bar being rearward of said wheels, said bar ends being thereby arranged in forward and rearward aligned pairs, an adjustable element carried by each depending bar for engaging each respective wheel to maintain the accuracy of position of the respective transverse bars, and a telescopic measuring bar adapted to be positioned to span first between one said pair of ends and then between the other said pair of ends, said measuring bar embodying a scale for reading the difference of the distances between the aligned pairs of ends of the transverse bars, each of the mentioned elements comprising a pointed rod adapted to impinge the wall of a tire on the respective wheel.

4. A device for measuring the alignment of a pair of wheels comprising a member embodying a magnet having a flat face for magnetic engagement with a machine-faced end of the hub of each wheel, there being two such members, one engaged with each wheel hub, a bar fixed to and depending from each member, a bar mounted transversely at the end of each depending bar, a spirit level on each member having the magnet for rotationally guiding the horizontal accuracy of position of the respective transverse bars, the ends of the latter bars being each equidistant from the vertical center of the wheels, one end of each transverse bar being forward of the wheels and the other end of each bar being rearward of said wheels, said bar ends being thereby arranged in forward and rearward aligned pairs, an adjustable element carried by each depending bar for engaging each respective wheel to maintain the accuracy of position of the respective transverse bars, and a telescopic measuring bar adapted to be positioned to span first between one said pair of ends and then between the other said pair of ends, said measuring bar embodying a scale for reading the difference of the distances between the aligned pairs of ends of the transverse bars, each of the mentioned elements comprising an extensible slide for locking engagement with the rim of a felly of each respective wheel.

5. A device for measuring the alignment of a pair of wheels comprising a pair of members magnetically engaged with the machine-faced ends of the hubs of said wheels, means fixed to and depending from each of said members alongside of each wheel, a member carried by each latter means midway of the ends thereof, said latter members extending horizontally parallel to the plane of the wheels, a stop on each end of each latter member, said stops being thereby arranged in pairs, one pair being forward of the wheels and the other pair rearward of the wheels, said forward and rearward pairs of stops being uniformly distant from the vertical middle of each respective wheel, means on each wheel hub-engaging member for effecting accurate positioning thereof to obtain commensurately accurate horizontal positioning of said horizontal members, and a transverse member adapted to be placed in engagement with each said pair of stops of the mentioned horizontal members for measuring the difference of the dimensional spaces between the stops of each said pair thereof.

6. In a device for measuring the alignment of a pair of wheels, a horizontal member extending parallel to the plane of each wheel, means magnetically mounting each horizontal member on the hub of each respective wheel, each member having a stop at each end thereof and the stops being uniformly distant from the vertical middle of each respective wheel, and a member adapted to be positioned against the two aligned stops on each side of the wheels to span each aligned pair of ends of said horizontal members for measuring the difference of the distances between said aligned pairs of ends, said latter member being adjustably extensible and having scale graduations for reading the difference of said distances with respect to zero in said scale.

7. In a device for measuring the alignment of a pair of wheels, a horizontal member extending parallel to the plane of each wheel, means magnetically mounting each horizontal member on the hub of each respective wheel, each member having a stop at each end thereof and the stops being uniformly distant from the vertical middle of each respective wheel, and a member adapted to be positioned against the two aligned stops on each side of the wheels to span each aligned pair of ends of said horizontal members for measuring the difference of the distances between said aligned pairs of ends, said latter member comprising a bar having an adjustably extensible end, a portion movable with respect to said extensible end, and a scale having an intermediate zero point on the extensible end for reading the relative position of the movable portion.

JOHN H. BENDER.
DONALD H. SHOOTER.

REFERENCES CITED

The following references are of record in the file of this patent:

UNITED STATES PATENTS

| Number | Name | Date |
|---|---|---|
| 1,829,133 | Frykman | Oct. 27, 1931 |
| 2,006,013 | Claywell | June 25, 1935 |
| 2,160,226 | Phillips | May 30, 1939 |
| 2,176,357 | Palmer | Oct. 17, 1939 |
| 2,190,709 | Friestedt | Feb. 20, 1940 |
| 2,275,137 | Friestedt | Mar. 3, 1942 |
| 2,285,965 | Halstead | June 9, 1942 |
| 2,438,358 | Castiglia | Mar. 23, 1948 |
| 2,474,616 | Castiglia | June 28, 1949 |

FOREIGN PATENTS

| Number | Country | Date |
|---|---|---|
| 517,039 | Great Britain | Jan. 18, 1940 |